June 30, 1925.
H. V. BURT
1,544,129
FISH LURE
Filed Sept. 20, 1924
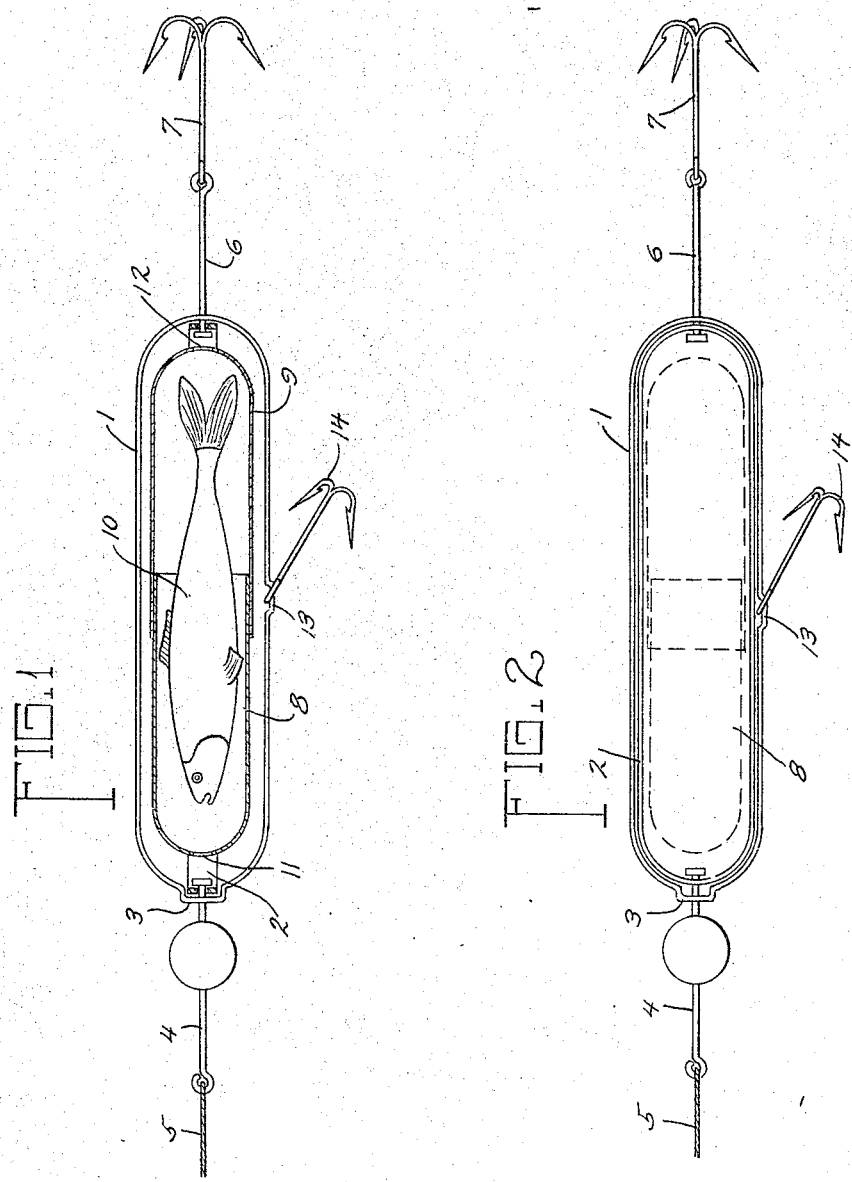
INVENTOR.
Hugh V. Burt
BY Walter N. Haskell.
his ATTORNEY.

Patented June 30, 1925.

1,544,129

UNITED STATES PATENT OFFICE.

HUGH V. BURT, OF ROCK ISLAND, ILLINOIS.

FISH LURE.

Application filed September 20, 1924. Serial No. 738,825.

*To all whom it may concern:*

Be it known that I, HUGH V. BURT, a citizen of the United States, residing at Rock Island, in the county of Rock Island and State of Illinois, have invented certain new and useful Improvements in a Fish Lure, of which the following is a specification.

My invention pertains to fish lures, the chief purpose thereof being to provide a novel means for holding a minnow or other live bait so as to be readily perceived by the fish.

Another purpose thereof is to provide a simple and efficient holder for the bait container, so arranged as to permit a quick removal or replacement of the container when it is desired to renew the bait.

In the drawings:

Fig. 1 is a longitudinal sectional view of the invention, as it appears when in use.

Fig. 2 shows the frame part in folded position.

The device embodies a frame, formed of sections 1 and 2, said sections being held normally in position in planes at right angles with each other by means of an off-set 3 in the end of the frame 1 into which the end of the part 2 enters, and in which it is held from turning. At this end the parts 1 and 2 are pivoted on a pin 4, attached to the end of a line 5. At the opposite end the frame members are pivoted on a pin 6, carrying at its outer end a hook cluster 7.

Adapted to be held within the frame is a container formed of telescoping parts 8 and 9, formed of transparent material, preferably of celluloid, on account of the relative lightness thereof. Said container is of such a diameter as to preclude the removal thereof from the frame when it is in an open position, and is sufficiently large to hold a good-sized minnow, as shown at 10, or other live bait, such as worms, a hellgrammite, and the like. The ends of the container are provided with openings 11 and 12, which permit the water in which the bait is immersed to pass through the container, and assist in keeping the bait alive. The movement of the bait is readily discerned through the wall of the container, and the fish are attracted thereby. If desired the frame 1 may be provided with one or more bends 13, for the attachment of additional hooks, as at 14.

It will be observed that the container is of an enlarged capsule formation, and the parts can, not only be readily separated to permit the placing of the bait therein, but they are also capable of contraction or expansion, to conform the length of the container to that of the frame in which it is held.

The section 2 of the frame is sufficiently resilient to permit the side bars to be sprung outwardly a little, bringing the ends nearer together, and withdrawing the end from engagement with the off-set portion 3 of the section 1. The inner section can then be easily turned, until it is in the same plane with the part 1, in which position the bait and container can be placed therein.

This device is of special advantage for use in catching fish which are expert in removing a minnow from a hook without being caught, and which calls for the use of an unusual quantity of the bait.

What I claim as my invention, and desire to secure by Letters Patent, is:—

1. In a device of the class described, a pair of frames, foldable one within the other, adapted to hold a container for bait, and means for holding said frames normally in open position.

2. In a device of the class described, a holder for a bait container, comprising a pair of frames having a pivotal connection at each of their ends, permitting the collapse of one of said frames within the other, the outer frame being provided with an engaging means for receiving the inner frame, and holding the same normally in an open position.

3. In combination with a frame having side bars capable of being collapsed one within the other, a bait container formed of transparent material, having openings in its ends, and formed of two telescopic sections, said container being held within said frame when the frame is in an open position, and capable of removal therefrom upon the frame being collapsed.

4. In a device of the class described, a holder for a bait container, comprising a pair of frames having a pivotal connection at their ends, permitting the collapse of one of said frames within the other, said frames having coacting means for holding the same normally in open position, means for attachment of a cord to one end of the outer frame, and means for attachment of a hook to its opposite end, and means in said outer frame for the attachment of an additional hook.

In testimony whereof I affix my signature.

HUGH V. BURT.